United States Patent [19]

Pilz et al.

[11] Patent Number: 5,734,571
[45] Date of Patent: Mar. 31, 1998

[54] METHOD FOR MODIFYING DATA LOADED INTO MEMORY CELLS OF AN ELECTRONIC POSTAGE METER MACHINE

[75] Inventors: Joachim Pilz; Olav Zarges, both of Berlin, Germany

[73] Assignee: Francotyp-Postalia AG & Co., Birkenwerder, Germany

[21] Appl. No.: 708,656

[22] Filed: Sep. 5, 1996

[30] Foreign Application Priority Data

Sep. 8, 1995 [DE] Germany ............... 195 34 528.2

[51] Int. Cl.[6] .................. G07B 17/00; G06F 17/60
[52] U.S. Cl. ............... 364/464.2; 235/375; 235/380; 235/382; 340/825.3; 340/825.31; 340/825.34; 364/464.15; 395/241; 395/244; 395/653; 395/712
[58] Field of Search ............... 235/375, 380, 235/382, 382.5; 340/825.3, 825.31, 825.32, 825.34; 364/464.11, 464.15, 464.2; 380/3, 4, 23, 25; 395/239, 241, 244, 609, 651, 653, 712, 726

[56] References Cited

U.S. PATENT DOCUMENTS

| | | | |
|---|---|---|---|
| 4,712,239 | 12/1987 | Frezza et al. | 380/20 |
| 4,746,234 | 5/1988 | Harry | 400/120.01 |
| 4,785,417 | 11/1988 | Obrea | 364/464.2 |
| 4,812,965 | 3/1989 | Taylor | 364/550 |
| 4,982,430 | 1/1991 | Frezza et al. | 380/50 |
| 5,132,716 | 7/1992 | Samuels et al. | 396/622 |
| 5,270,931 | 12/1993 | Appleford | 364/424.012 |
| 5,307,505 | 4/1994 | Houlberg et al. | 395/200.83 |
| 5,311,582 | 5/1994 | Davenport et al. | 379/143 |
| 5,349,685 | 9/1994 | Houlberg | 395/800.4 |
| 5,406,624 | 4/1995 | Tulpan | 380/4 |

FOREIGN PATENT DOCUMENTS 0660269  6/1995  European Pat. Off. .

Primary Examiner—Edward R. Cosimano
Attorney, Agent, or Firm—Hill, Steadman & Simpson

[57] ABSTRACT

In a method for modifying data loaded into memory cells of an electronic postage meter machine having a microprocessor which executes steps for a routine controlled by an external storage medium, a data modification mode is entered into by plugging a programmed, read-only memory module, which contains a program to be interpreted, into communication with the microprocessor and the program is loaded from the module into the microprocessor, a check routine is executed in a secure region of the postage meter machine for checking the validity of the loaded program, and given validity of the loaded program, the data in the postage meter machine are modified including initialization of an interpreter routine, with the interpreter routine being executed in the data modification sequence.

18 Claims, 4 Drawing Sheets

| OPERATION | TYPE | VALUE |
|---|---|---|
| C WRITE | T XXXX | — |

METHOD FOR MODIFYING DATA LOADED INTO MEMORY CELLS OF AN ELECTRONIC POSTAGE METER MACHINE

BACKGROUND OF THE INVENTION

1. Field of the Invention

The present invention is directed to a method for modifying the data of an electronic postage meter machine loaded into memory cells and particularly to such a method which improves the security of the postage meter machine.

2. Description of the Prior Art

In a postage meter machine disclosed in U.S. Pat. No. 4,746,234, fixed and variable data are stored in memories (ROM, RAM). When a letter on the conveying path actuates a microswitch in front of the printing position, these two datasets are read out with a microprocessor in order to form a print control signal. The two are then electronically composed to form a print format and can be printed with a thermal transfer printer onto an envelope to be franked.

A valid franking that is not accounted for in the activated condition must be prevented for such postage meter machines that deliver a fully electronically generated imprint for franking postal matter, including the impression of an advertizing slogan.

Known postage meter machines have at least one memory that contains relevant postal registers for the aggregate value used (ascending register), for the remaining credit that is still available (descending register) and a register for a checksum. The checksum is compared to the sum of the aggregate value used and the available credit. A check for proper debiting is thus possible.

Fundamentally, every franking that is undertaken must be debited and any manipulation that leads to a non-debited franking must be prevented.

U.S. Pat. No. 4,812,965 discloses a remote inspection system for postage meter machines that is based on specific messages in the imprint of postal matter that must be sent to the central or on a remote interrogation via modem. Sensors within the postage meter machine are intended to detect any falsification action that is undertaken, so that a flag can be set in appertaining memories if an intervention was made in the postage meter machine for manipulative purposes. Such an intervention could ensue in order to load an unpaid credit into the registers.

Upon determination of a manipulation, the postage meter machine is blocked by a signal proceeding from the data central during the remote inspection via a modem. It is still possible, however, for a skilled manipulator to reset the flag and the registers into their original condition after the production of flanking imprints that were not debited. Such a manipulation could not be detected via remote inspection by the data central if this manipulation that had been cancelled preceding the remote inspection. The reception of a postcard from the data central on which a franking is to be undertaken for inspection purposes also allows the manipulator to reset the postage meter machine into its original condition in time. Higher security thus cannot yet be achieved in this way.

European Application 660 269 discloses measures for enhanced security against manipulation in conjunction with an OTP processor (one-time programmable) without requiring a special mechanical encapsulation of the security-relevant component parts, or a sensor for recognizing that the housing has been opened. In particular, an OTP processor with an internal non-volatile memory (NV-RAM) is disclosed. The data security can be enhanced in that a manipulation is recognized by check routines, however, such a special OTP processor can only be acquired at a higher price. Further, such a special OTP processor cannot yet guarantee the data security by itself if the entire program code that is required is not present stored in the internal OTP-ROM. This, however, cannot be expected given an extensive program code.

European Application 660 269 proceeds on the basis of a postage meter machine that has a closable and sealable flap that only allows a limited, specifically trustworthy group of persons to access the hardware (EPROM base) lying therebehind. It can be assumed here that these persons will not undertake a manipulation of the postage meter machine.

Previous procedure in the basic setting of the postage meter machine in the manufacturing process provided that the machine parameters be set by reset software that was made accessible to the machine with a reset EPROM and that was processed by the intrinsic processor of the machine. To that end, the reset EPROM was inserted into the external slogan base and was enabled by actuating the default key.

The fact that a program branch into the code area of the external EPROM base ensues by actuating the default key makes a manipulation of the machine software with alien EPROMs possible. A manipulation by the end user thus would require the destruction of the postal seal, but this would hardly impede a technically capable manipulator from carrying out this step if he obtains possession of such a reset EPROM. The group of trustworthy persons who are allowed to open the postal flap would have to be greatly expanded for customized modification of some machine parameters that are indispensable for the leasing of postage meter machines.

This possibility of manipulation is unacceptable since the readout of the otherwise protected OTP-proper memory cells would also be enabled in addition to the modification of register readings. Moreover, the sealed postal flap that protects the default key and the EPROM base against demonstrably illegal access with the postal seal would be made legally accessible to a larger group of persons. A higher probability of an unnoticed manipulation thus exists. A partially opened postal flap, on the other hand, has the advantage that the user has access to the slogan EPROM base and can change the slogan EPROM himself. The postage meter machine user could thereby eliminate service costs or limit them to the necessary extent. This base is connected to the microprocessor bus, thus a manipulation could ensue by a manipulator inserting a manipulated program EPROM that, like a reset EPROM, assumes control of the microprocessor system and, thus, monetary values, entries or security entries could be intentionally varied in the postage meter machine, or the manipulator could insert a manipulated slogan EPROM that contains modified print data of the value stamp (location of the sender, postal zip code of the sender) and which would result in a manipulation of the value stamp imprint.

A postage meter machine is thus needed, which allows a partially opened postal flap with which the security can nonetheless be maintained, and this means additional measures for an external memory (reset EPROM or service EPROM) that can modify the data of an electronic postage meter machine loaded into memory cells (for example, in NVRAMs) must be undertaken.

SUMMARY OF THE INVENTION

An object of the present invention is to provide a method for operating a postage meter machine which overcomes the disadvantages of the prior art noted above and which achieves a significant increase in security of a postage meter machine. The security-relevant program portions are stored inside the postage meter machine for those functions that are to be executed in the service mode. The security housing should be replaced by a housing that improves the accessibility to individual components of the electronics for a service technician. A processor without an internal NV-RAM should thereby be utilized. A further object is to improve the security of the data in the postage meter machine that are modified or entered with an external memory in an action by the service technician or an employee of the user. Future program portions can be loaded that expand the original program and which are to be executed in service mode.

These objects are achieved in a method for modifying the data of an electronic postage meter machine loaded in memory cells, having a microprocessor in a control unit of the postage meter machine for executing steps for a routine that is controlled by an external storage medium, wherein entry into a special mode that allows a modification of the data loaded in memory cells of the electronic postage meter machine, whereby the storage medium is a correspondingly programmed, pluggable read-only memory module (for example, EPROM) that contains a program to be interpreted, and loading the program to be interpreted being loaded from the plugged-in read-only memory module (EPROM) into the postage meter machine. A test routine is then called, which executed in a secure, internal region of the electronic postage meter machine, for determining the validity of the loaded program to be interpreted, the test routine at least containing instructions in the predetermined memory location, whereby the finding of validity is based on an authentification method. Modification of data in the postage meter machine given validity of the loaded program to be interpreted that was checked with the authentification method then takes place, if permitted. An access code enables access to the corresponding special mode, in order to copy a data structure during loading that is subsequently interpreted. This can be accomplished by following a step for initialization of an interpreter routine, executing the steps of an interpreter routine sequence in order to modify the data in the postage meter machine. In order to interpret the data, a plausibility check is first carried out on the copy. It is thereby ensured that the processor carries out only operations which are located exclusively in the code region of the operating program. The operating program is stored in the program memory internally in the postage meter machine. This data structure comprises information that is processed by the interpreter in a predetermined way. The test routine of the postage meter machine is exited if the loaded program to be interpreted is invalid, and steps are undertaken for the prevention of a further program execution for manipulation. Alternatively, if the loaded program is interpreted as invalid, a program branch that leads from the electronic postage meter machine to the outside which does not permit exterior communication with internal components is made.

The interpreter routine is executed in the existing system once before, and a second time after, the program part for the functions. Accordingly, the data/program areas that are read from the external storage medium for this purpose are referred to as prologue and epilogue. A start is triggered, e.g., by the actuation of an entry key, and that an access authorization check then ensues internally in the postage meter machine. After the start, triggered as specified above, an entry into the special mode ensues on the basis of a successful access authorization check. In a first step, a copying of the prologue or epilogue into the internal data region of the internal OTP-RAM first ensues. Then, in a further step, an encoded checksum, e.g. Message Authentification Code (MAC) is formed, by carrying out a (DES) encoding of a (CRC) checksum over the PROLOG or EPILOG code region. In the following check step, there ensues a comparison of the MAC formed in the above way with the MAC checksum, which was formed during the manufacturing or programming of the special EPROM and stored in the special EPROM, over the PROLOG code region or the EPILOG code region. The interpreter routine includes a plausibility check, which prevents processing of impermissible commands or data, and includes routines that carry out the modification of the data, data structures or program portions in the memory cells of the postage meter machine. After the steps for conducting the interpreter routine, a further check step is provided, which determines whether any error cases that arose during the processing of a program or cases which lead to the termination of the interpretation process, or branches back to a further check step in order to process further commands.

The invention is preferably based on a processor that can only be programmed once (one-time programmable). For example, an enhanced security can be achieved with a mask-programmed microprocessor that has I/O ports accessible from the outside and an internal bus structure, an internal ROM, and internal RAM for security-relevant executions. Security-relevant data and routines are burned into the internal ROM during manufacture.

Another preferred version is based on a postage meter machine with microprocessor wherein the microprocessor contains an internal ROM that does not allow a readout of the program code contained therein. This can be a commercially available OTP (one-time programmable) processor that is placed in such a condition after the programming event by setting/burning a readout block or barrier.

The postage meter machine can also be equipped with an OTP type processor that allows a readout of security-relevant data and programs in encoded form (encryption table). This has the advantage that it is possible to check whether the data were properly stored.

The invention can also be utilized for microprocessor systems secured in some other way.

The invention has the advantage of influencing the program flow—that is predetermined by the internal operating software of the machine—with external storage media, whereby no program branch of the CPU into the memory areas of the external storage medium, and thus no undesired control of the processor, is enabled for this purpose. In order to protect the program sequences that can thus be integrated into the program flow with external media against manipulation, the prologue and epilogue are respectively secured by an MAC.

As long as no program branch occurs into external storage means, there is a reliable protection against fraudulent manipulation. A protection of externally stored program parts that are present stored, for example, in an EPROM is also advantageously enabled with the program parts that are implemented in the internal OTP ROM.

An advantage of the inventive method is that the slogan EPROM can be unproblematically plugged into the base, or can be replaced not only by the service technician but also by any other authorized person. Specific driver circuits (buffers) connected between bus and EPROM base prevent internal data of the postage meter machine from being read out to the outside. On the other hand, data can be entered into the postage meter machine via the base at any time.

An embodiment of the inventive method includes the following steps.

A default key is actuated and an access authorization is checked on the basis of an access code for entering into the special mode that is stored in the externally plugged read-only memory module (EPROM), and the program to be interpreted is loaded from the externally plugged-in read-only memory module (EPROM) into the postage meter machine. A first MAC checksum is formed in the processor of the electronic postage meter machine covering a first content (prologue) to be interpreted from the contents of that external memory to which a first MAC (message authentification code) is allocated. The MAC checksum formed in the above way is compared to the value of the first MAC stored in the external storage means with said processor. A processing routine for processing the transmitted, first memory content (prologue) is implemented in the processor after the interpretation of the loaded program, or the check routine of the postage meter machine is exited when the data are invalid and steps are implemented for preventing a further program execution for manipulation, or a program branch is made which leads to the outside from the processor. Internal routines for modifying data in memory cells of the postage meter machine are implemented, given a valid program. A further program to be interpreted from is loaded from an external, plugged-in read-only memory module (EPROM) into the postage meter machine. A second MAC checksum is formed in the processor covering a second loaded content (epilogue) to be interpreted, from the contents of that external memory to which a second MAC (message authentification code) is allocated. The second MAC checksum formed in the above way is compared to the value of the second MAC stored in the external memory means in the processor. A processing routine for processing the transmitted, second memory content (epilogue) is executed in the processor given equality of the MACs after the interpretation of the loaded program to be interpreted, and the epilogue processing routine is ended or the execution of the check routine is prevented if an error is found.

The opened flap allows a data structure to be supplied from the outside with a specific EPROM via the external EPROM base, this data structure contributing to the modification of the postage meter machine status under the influence of an internal interpreter given actuation of the protected default key.

The interpreter routine, as a specific routine that is stored in the internal program memory of the postage meter machine, is activated by a data structure supplied from the outside via the external EPROM base and collaborates with the operating program parts stored in the internal program memory of the postage meter machine in order to interpret data. An access key enables access to the corresponding special mode, whereby the aforementioned data structure contains data that are processed by the interpreter routine and whereby said processor executes operations that are located exclusively in the code area of the operating program in the internal program memory of the postage meter machine.

Interpreter routines can also fundamentally be executed in the dealer mode. A number of areas that contain code to be interpreted are provided in the external storage medium, the individual areas being secured with MAC. A mode for processing service functions with execution of interpreter routines is provided within the routines for service functions when these code routines to be interpreted are called via the keyboard. For this purpose, upon actuation of a key located on the postage meter machine keyboard, the area allocated to this key is loaded into the postage meter machine from the external storage medium, authenticated, and interpreted given coincidence. The normal processing of the pressed key is continued if no code to be interpreted is allocated to this key.

In a further embodiment, the inventive method includes the following steps. An transmitting an externally stored, predetermined MAC value is transmitted into the OTP-RAM for volatile storage and a first MAC checksum is formed covering a first portion (prologue) of the contents of that memory to which a first MAC is allocated. Entry is made into the mode for processing service functions and implementing routines for service functions with interpreter routines, followed by an ending of this mode. An externally stored, predetermined MAC value is transmitted into the OTP-RAM for volatile storage and a second MAC checksum is formed in the OTP processor covering a second portion (epilogue) of the contents of that memory to which a second MAC is allocated.

DESCRIPTION OF THE PREFERRED EMBODIMENTS

Figure 1:
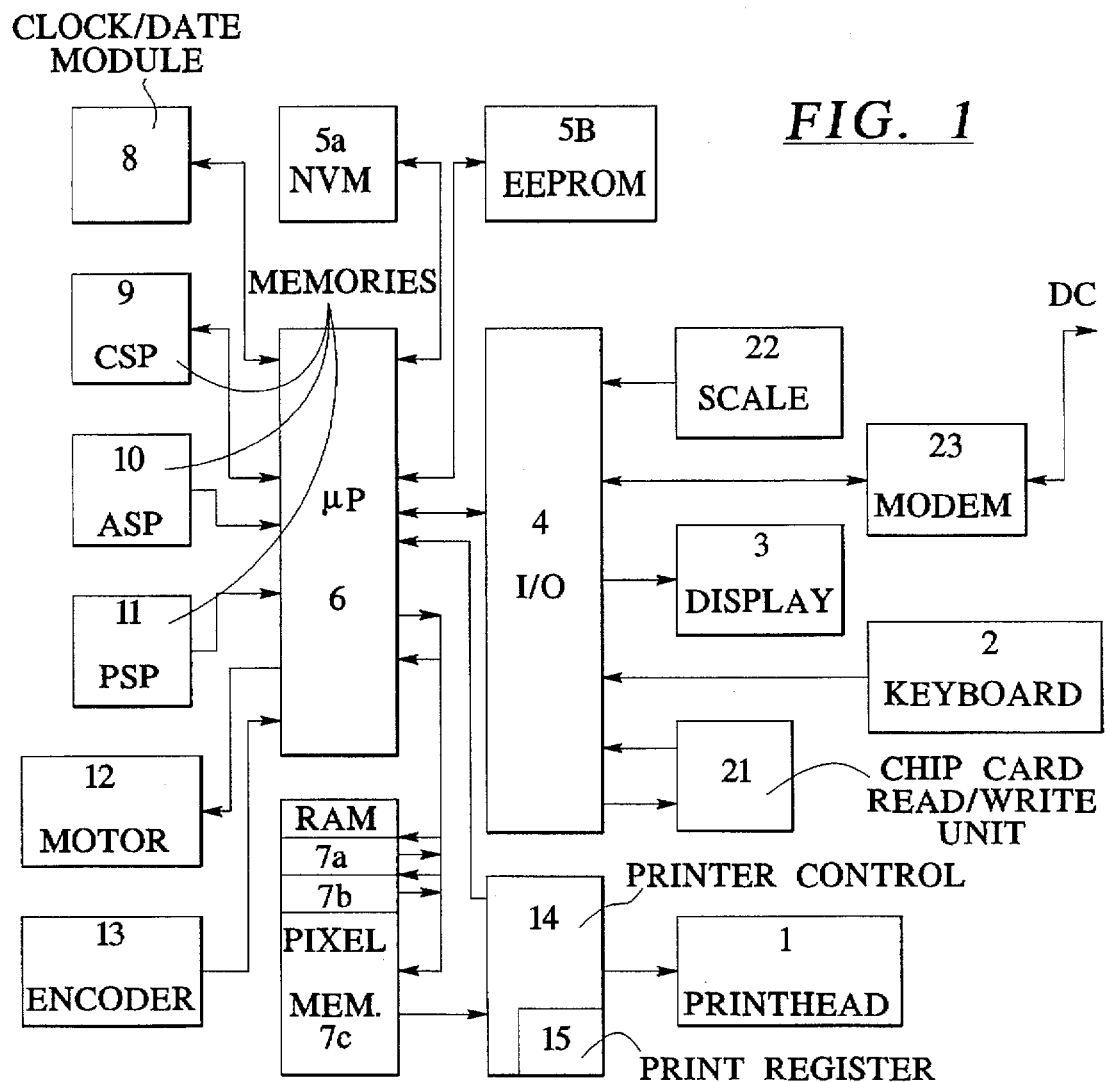
FIG. 1 is a block circuit diagram of a postage meter machine with enhanced security operating in accordance with the principles of the present invention.

FIG. 1 shows a block circuit diagram of an electronic postage meter machine with enhanced security provided by the invention. The invention is based on a postage meter machine with a microprocessor that contains an internal OTP-ROM that does not allow the program code contained therein to be read out. Moreover, security-relevant data are stored in the internal OTP-ROM. For preventing the readout with an external intervention, corresponding security bits can be set in the microprocessor during the manufacture of the postage meter machine. This can be a commercially available OTP processor that is placed in such a condition by setting/burning a readout barrier after the programming event, or this can be a microprocessor with mask-programmable ROM that no longer allows a readout of the program code after the manufacturing process, or only allows a readout of the program code and of the data in encoded form.

FIG. 1 shows a block circuit diagram of the inventive postage meter machine with a print head 1 for a fully electronically generated franking format, with at least one input means in the form of a keyboard 2 having a plurality of actuation elements, a display unit 3, a modem 23 producing the communication with a data central, and further input means such as a chip card read/write unit 23 or a scale 22. These are coupled via an input/output control module 4 to a control unit 6 and to non-volatile memories 5a, 5b, 9, 10 and 11 for data or programs that encompass the variable or, respectively, the constant parts of the franking format. A franking image to be printed is compiled separately or in combination (with respect to the variable and constant parts) in one or more of these memories and is transferred to (or compiled for the first time in) a print register 15 in a printer control 14, which operates the print head 1.

A character memory 9 supplies the necessary printing data for the variable parts of the franking format to a volatile main memory 7 which includes memory regions 7a, 7b and 7c, with region 7c serving as a pixel memory. The control unit 6 is a microprocessor µP that is in communication with the input/output control module 4, with the character memory 9, with the volatile main memory 7 and with non-volatile main memories 5a and 5b that form a cost center memory, with a program memory 11, with the motor 12 of a conveyor or feeder device, possibly with strip delivery, with an encoder (coding disk) 13 as well as with a clock/date module 8. The individual memories can be realized as a number of physically separate modules or can be combined in a few modules in a way that is not shown. That memory module that includes the non-volatile main memory 5b, for example, can be an EEPROM that is secured against removal with at least one additional measure, for example gluing onto the printed circuit board, sealing or casting with epoxy resin.

Figure 2:
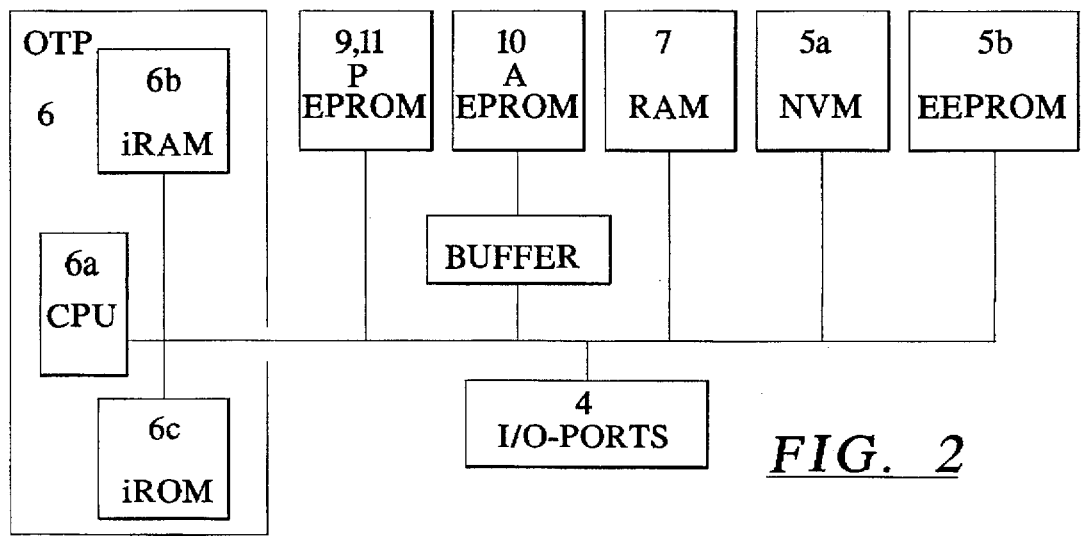
FIG. 2 is a block circuit diagram of a further version with an OTP for the control of the postage meter machine.

FIG. 2 shows a detail of the block circuit diagram of the electronic postage meter machine for a version with an OTP as the control unit 6. In this version, the OTP includes a central processing unit (CPU) 6a, and an internal RAM (iRAM) 6b and an internal ROM (iROM) 6c. Given this basic arrangement shown in FIG. 2, sensors and actuators such as, for example, the encoders 13 and motor 12 shown in FIG I can be optionally connected to the OTP either directly or via I/O ports.

A preferred version of a microprocessor is an 8051 processor with 16 kByte on-chip EPROM (Philips 87C51FB). Such an OTP (one-time programmable) type cannot be erased with ultraviolet light because it does not have a window suitable for the passage of UV light. An OTP unit therefore can be programmed only once. The internal OTP-RAM has a memory area of 256 bytes.

The invention further assumes that security-relevant data and program parts that are present stored in the internal OTP-ROM include an interpreter.

The interpreter is a specific routine that is stored in the internal OTP-ROM and is activated by a data structure supplied from the outside via the external EPROM base and that collaborates with the operating program parts stored in the internal OTP-ROM in order to interpret data.

An access key enables access to the special mode that includes the aforementioned data structure processed by the interpreter and that executes OTP-internal CPU operations that are located exclusively in the code area of the operating program in the internal OTP-ROM.

The interpreter is integrated in the operating software and processes defined data structures of the external EPROM at the beginning and end of the dealer operating mode. A designational modification of memory cells of the machine is thus inventively enabled. Additional operations can thus be executed by an update of the external service EPROM without having to modify the operating software itself and without allowing the take-over of the program control by branching into the external code area.

In a further variant (shown in more detail in FIG. 6), the step 35 (FIG. 5), carried out in dealer mode, likewise includes a processing of interpreter routines (steps 3717, 3727, 3737). For this purpose, several regions A, B, C are provided in the external service EPROM that contain code to be interpreted, whereby the individual regions are again protected by means of MAC. A functionality can thereby subsequently be installed in the postage meter machine that was not previously present. For a method for the execution of interpreter routines within the routines for dealer functions, these code routines to be interpreted can be called up via the keys a, b, c of the keyboard 2. Thus, in the external service EPROM in the region A, space can also be present for a separate routine that is called up by an actuation means or, respectively, an input means, e.g. by a key a located on the postage meter machine keyboard. This is checked in step 3711, and branching then takes place to a checking step 3712, in order to check whether a corresponding code exists in the EPROM region A, if the key a is actuated. If no code to be interpreted is present, in step 3713 the normal processing of the keystroke is continued with the standard functions that are stored inside the postage meter machine. Otherwise, the code to be interpreted is loaded from the external service EPROM into the postage meter machine in step 3714, is authenticated in step 3715 and is interpreted in step 3717, if agreement has been determined in step 3716. A routine that is running in a faulty manner in the machine can thus be replaced or supplemented. If step 3711 indicated key a was not actuated, the routine proceeds to check in step 3721 whether key b was actuated. If so, steps 3722 through 3727, respectively corresponding to steps 3712 through 3717, are executed. The same sub-routine is provided in steps 3731–3737 for key c if step 3721 indicated that key b was not actuated, these steps being indicated in summary form in FIG. 6.

Inventively, the software for the dealer and reset mode is moved into the interior of the machine (i.e. into the internal EPROM and/or internal OTP-ROM), so that no branch into the code area of the external memory with which the memory cells could be modified ensues in these operating modes. To that end, the reset and service of dealer EPROMs also to be externally introduced respectively contain a 64 bit key that enables access to the corresponding modes. The CPU thus only executes operations that are located in the code area of the machine software that are additionally protected against manipulation by a cyclical MAC check. So that the functions of the reset operating mode, which are thus located in every machine, cannot be utilized for manipulation, the functionality of this operating mode was limited such that no incrementation of the amounts of money or modification of the telepostage parameters is enabled.

An external storage medium places the postage meter machine into a special operating condition in which the data content of memory cells can be modified. Data or program code are/is transferred from an external storage medium that is connected to the postage meter machine into a memory of the postage meter machine by the internal microprocessor of the machine. The data/program area contains a MAC that authenticates the area. The microprocessor 6 of the machine undertakes the check of the validity on the copy. When the data/program code are plausible, then they are either directly processed by the microprocessor 6 as program code or are interpreted by an interpreter software that controls the microprocessor 6. Non-authenticatable data/program areas are not further processed. The processing of the externally supplied information is used for modifying internal memory cells of the machine. Since the external data/program areas are not directly processed by the processor 6 this being always based on the internal copy, the CPU 6a cannot be controlled by external, manipulated program areas.

The function of the interpreter is explained in greater detail with reference to FIGS. 3 through 5.

Figures 3, 4:
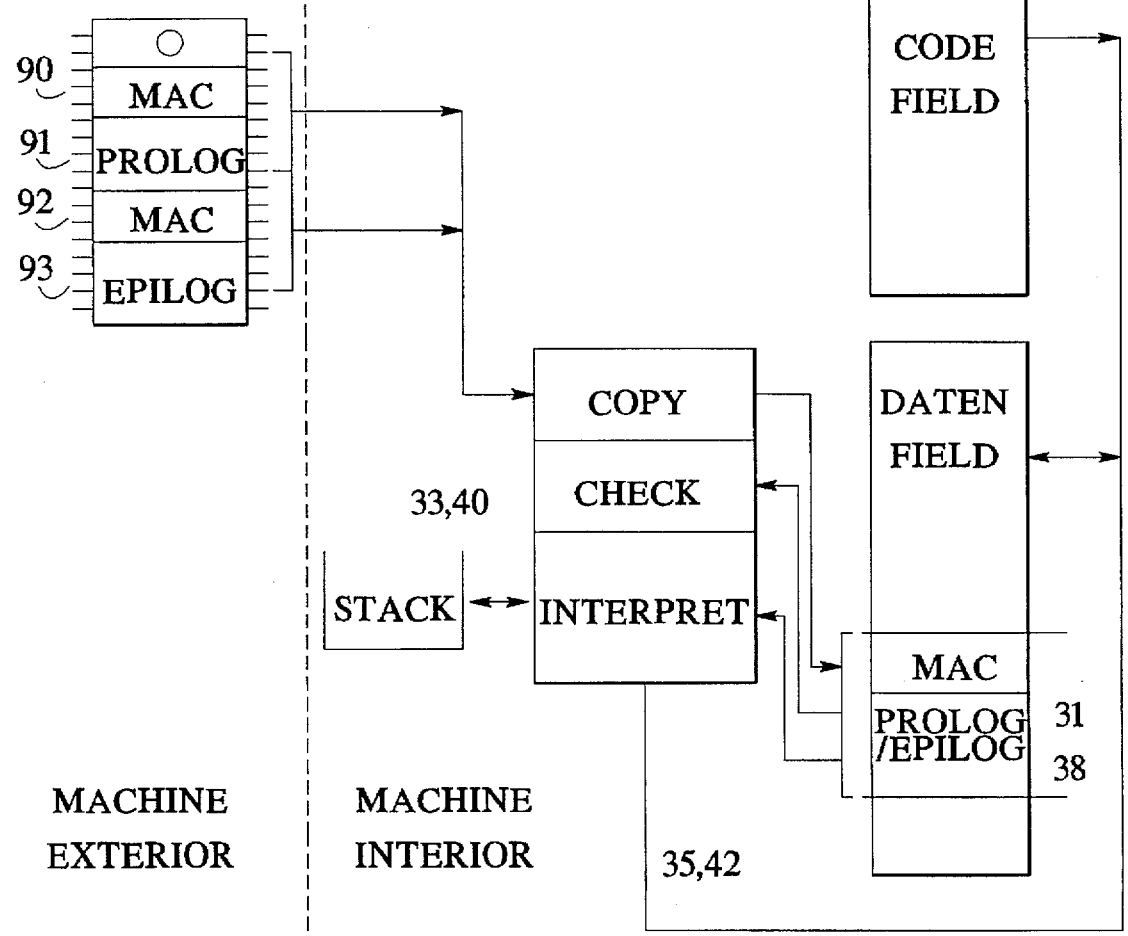
FIG. 3 illustrates the arrangement of a dataset that can be processed by the interpreter in accordance with the principles of the present invention.
FIG. 4 is a flowchart showing the schematic arrangement and the data flow of the interpreter in accordance with the principles of the present invention.

FIG. 3 shows the structure of a dataset that can be processed by the interpreter. The information that can be processed by the interpreter is formed by a number of commands that are basically composed of a dataset with three components. A first component, OPERATION, identifies the operation to be executed by the respective command. A second component, TYPE, identifies the type of value that has been indicated in a third component, VALUE.

The manner by which the value of the program line or of the stack or of the addressed memory area is to be typed is defined by the TYPE for some instructions. When no type particular is required for the instructions, then the type is to be indicated as T_None.

Interpretable information contained in the service EPROM is composed of n lines. The lines of the program are numbered in ascending fashion beginning with 0 and can thereby be addressed for the execution of branch instructions. Each program line has the structure: OPERATION; TYPE; VALUE. In another version, unitary operators (no TYPE, no VALUE) are also allowed.

The commands refer to a 12-stage stack memory and allow, for example, the readout of memory cells, the execution of logical and arithmetic operations on the stack as well as the storage of stack entries in memory cells of the machine. Code memory cells and all data memory cells of the machine can be thereby addressed. A logical comparison operation with the appropriate conditional and unconditional branch instructions is available for controlling the program flow during the interpretation.

The flowchart shown in FIG. 4 shows the schematic structure and the data flow of the interpreter. The interpretable data structure in the external EPROM must, of course, be protected against potential manipulations with appropriate measures since all data memory areas of the machine are accessible and can be manipulated with the interpreter. Two interpretable memory areas are located in the service EPROM. With reference to the time at which they are interpreted, they are referred to as prologue (block 91) and epilogue (block 93). Each area is protected by a MAC checksum (blocks 90 and 92). Before the data structure is processed in steps 35 and 42, the interpreter makes a copy of the structure and of the MAC (steps 31 and 38) in the internal RAM of the machine and subsequently implements a plausibility check (steps 33 and 40) on the copy. Working on an internal copy thereby prevents the external manipulation of the program during the interpretation thereof.

In the aforementioned operation, the code words to be interpreted that are contained in the prologue are interpreted step-by-step until the end is reached (or an error has occurred). The prologue and epilogue differ basically only in terms of the time at which they are executed. Data can thus be saved in the prologue before the start of the internal dealer routine of the machine and, thereafter these data can in turn be restored in the epilogue.

Figure 5:
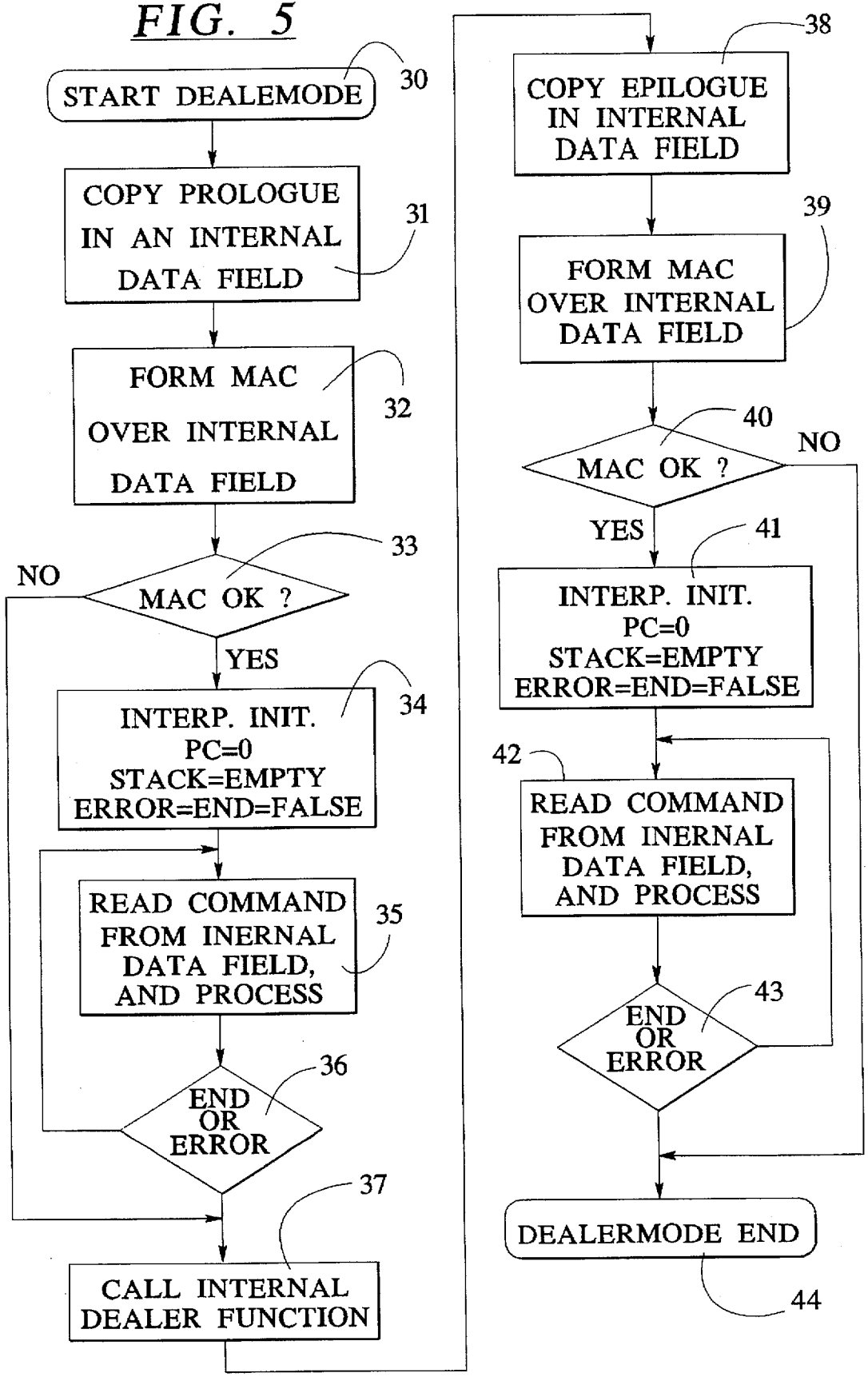
FIG. 5 is a flowchart showing the logical embedding of the interpreter into the internal service functionality in accordance with the principles of the present invention.
Figure 6:
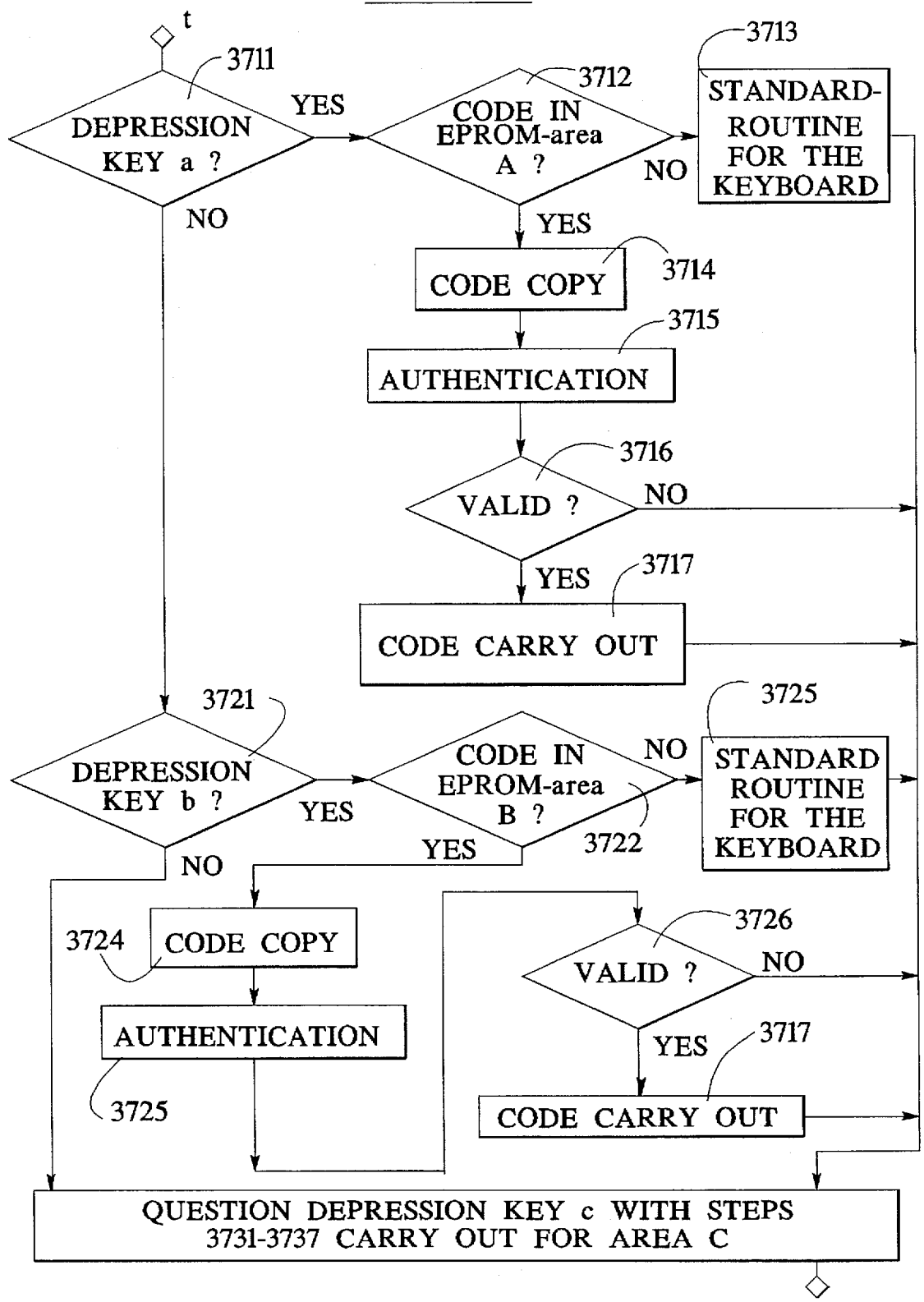
FIG. 6 is a flowchart showing the dealer mode step.

The flowchart shown in FIG. 5 shows the logical embedding of the interpreter into the internal service or dealer function.

The structure in the service EPROM is formed by a table in which every line is composed of the components operation, data type of the value or of the operation, as well as the value. In addition to the structure of a dataset shown in FIG. 3 that can be processed by the interpreter, each line can include a fourth component for describing the command. The interpreter processes the table line-by-line. The sequence of the processing can be thereby influenced by branch operations.

After the start in step 30, which is triggered by the actuation of the default key, a copying of the prologue into the internal data area of the internal OTP-RAM ensues in step 31. A MAC checksum is formed in step 32 by DES encoding of the CRC checksum over the prologue code area. A MAC checksum was already formed over the prologue code area and stored in the EPROM in the manufacture or the programming of the EPROM. For authentification of the data in the prologue code area of the inserted, external EPROM, a comparison of the MAC volatilely stored in the internal OTP-RAM with the MAC non-volatilely stored in the external service EPROM ensues in step 33. A branch is made to step 37 given non-coincidence of the two MACs. Otherwise, given a coincidence of the two MACs, a branch is made to step 34 in order to initialize the interpreter. In the following step 35, a command is read out from the internal data area of the internal OTP-ROM and is processed. A check is made in step 36 to determine whether an error occurred or the end of the command execution has been reached. Given an error or at the end of the command execution, a branch is made to step 37. Otherwise, a branch is made back to step 35.

Initially, the command pointer points to the first code word to be processed. In step 35, the code words are successively loaded into a processor register. Permissible code words are then processed by executing a specific routine. The command pointer is incremented after every code word. When a command also requires data (for example, the destination of a branch after a comparison or an address), then these are likewise loaded and the command pointer is incremented. Specific code words to be interpreted serve for the branching of the program; the command pointer is then set to a different point and the processing is continued at this point. The processing is ended when an error occurs or when an end code is recognized.

Internal service or dealer functions that are present stored in the internal OTP-ROM as program code are executed in step 37. These functions include corresponding inputs, for example via the postage meter machine keyboard or comparable actuation or input means that are to be actuated in order, for example, to change the customer number, input new PIN, change the telephone number, or change the limit warning.

One then advances from step 37 to step 38 in order to correspondingly process the epilogue. A copying of the epilogue into the internal data area of the internal OTP-RAM ensues in step 38. A MAC check sum is formed in step 39 by DES encoding of the CRC checksum over the epilogue code region. A MAC checksum was already formed over the epilogue code region and stored in the EPROM during the manufacture or the programming of the EPROM. For authentification of the data in the protected code region of the inserted, external EPROM, a comparison of the MAC volatilely stored in the internal OTP-RAM to the MAC non-volatilely stored in the external service EPROM ensues in step 40. A branch is made to step 44 given non-coincidence of the two MACs. Otherwise, given coincidence of the two MACs, a branch is made to step 41 in order to initialize the interpreter. In the following step 42, a command is read out from the internal data area of the internal OTP-ROM and is processed. A check is made out in step 43 to determine whether an error occurred or whether the end of the command execution has been reached. A branch is made to step 44 given an error or at the end of the command execution. Otherwise, a branch is made back to step 42. The method is ended in step 44.

The following error cases, which lead to the termination of the interpretation procedure, can occur in the processing of a program: stack capacity is inadequate or the stack does not contain enough entries for the required operation, infraction of the data type limitations of an operation, interpretation of an unknown operation, or exiting the program area due to an invalid branch destination.

The interpreter has a limited stack available to it (set depth: 12 entries). The values are deposited on the stack as structure of long value (32 bits) and data type.

An initialization of the postage meter machine based on such settings ensues with a reset or master EPROM before the assembly of the postage meter machine. The setting of, for example, a serial number of the postage meter machine or of a customer number or other settings can be repeatedly undertaken at any time with a service EPROM. Upon utilization of a service EPROM, the unsealed service flap that releases the external service EPROM socket must be opened and then the sealed postal flap that releases the default key must be opened. Normal operation of the postage meter machine is not possible in this opened condition. After the check of the corresponding 64-bit access key and of the authenticity of the data by the check routine, the access authorization is granted and the appropriate program is called in order, for example, to change the serial number. Data in the form of a number or alphanumerical characters that are displayed in the display unit can be entered via the keyboard 2, modem 23 or the chip card write/read unit 21 of the postage meter machine; specific, further input steps ensue in order to erase or new input or to modify the machine number.

It is not only customer numbers or other settings that are related to the service or dealer mode that can be protected. Fundamentally, serious errors can be eliminated by a person authorized for that task on the occasion of the next on site inspection. Such an error, for example when the processor cannot access the main memory, i.e. can neither read nor modify the data content of the RAM, is eliminated, for example, by plugging-in a special reset EPROM. To this end, the lead seal of the postal flap for the default key must again be eliminated and the service flap, and thus the postage meter machine, must be opened. The special reset EPROM contains the required data, for example the corresponding key, and specific programs for restoring the postage meter machine function. For example, such a program can in turn cancel a reduction in redundancy that has ensued or faulty storings. When a sub-program is called in order, for example, to modify the values in the registers, specific, further input steps ensue in order to erase or newly enter or modify the register entry.

The following is an exemplary scenario. The routine for manual input of the postage call number that is located in the internal operating software of the machine proves faulty in the area in that, for example, it erroneously overwrites the serial number of the machine. Since this function is located in the internal EPROM of the machine, it can only be corrected by an update of the operating software, this meaning the opening of the machine and changing the EPROM as well as, possibly the OTP processor. Leaving the outlay out of account, the dealer is not permitted to carry out these events.

The integrated interpreter then offers the following possibility. The machine developer sends an update of the service EPROM to the dealer. It contains a prologue that copies the memory content of the serial number into a free, temporary memory of the machine. The dealer function for modifying the postage call number in fact continues to destroy the serial number; this, however, can now be restored from the copy of the prologue by a corresponding epilogue that is called at the end of the dealer functionalities. The interpretation of the prologue and epilogue data structures is inventively utilized for processors having strict separation of program and data memories.

This separation is no longer present in modern processors, so that the data structure can thereby also be formed of machine instructions that can be directly processed by the processor, these being first copied into the machine and being capable of being called as sub-program after passing the test. The function scope would thus no longer be limited to the operations of the interpreter language but would correspond to the entire performance scope of a higher programming language.

Although modifications and changes may be suggested by those skilled in the art, it is the intention of the inventors to embody within the patent warranted hereon all changes and modifications as reasonably and properly come within the scope of their contribution to the art.

We claims as our invention:

1. A method for modifying data loaded into memory cells of an electronic postage meter machine, said electronic postage meter machine having a microprocessor for executing steps for a routine controlled by an external storage medium, said method comprising the steps of:

(a) entering into a mode that allows a modification of the data loaded in the memory cells of the electronic postage meter machine, plugging a programmed, read-only memory module that contains a program to be interpreted into communication with said microprocessor, and loading the program to be interpreted from the plugged read-only memory module into the postage meter machine;

(b) calling a check routine, which executes in a secure, internal region of the electronic postage meter machine, for checking the validity of the loaded program to be interpreted, in a predetermined memory location, with a finding of validity being based on an authentification method; and (c) modifying said data in the postage meter machine given validity of the loaded program to be interpreted that was checked with the authentification method, including initializing an interpreter routine, executing said interpreter routine in a sequence to modify the data in the postage meter machine, and exiting the check routine of the postage meter machine if the loaded program to be interpreted is invalid and automatically executing security protection measures.

2. A method as claimed in claim 1 comprising the additional steps of:

storing said interpreter routine in an internal program memory of said postage meter machine;

providing an externally accessible EPROM base on an exterior of said postage meter machine and activating said interpreter routine by applying activating data from the exterior of said postage meter machine via said external EPROM base for causing said interpreter routine to operate, in combination with an operating program for said postage meter machine;

activating an access key to enter into said mode that allows modification of the data; and including data in said activating data which are processed by said interpreter routine and said microprocessor executing operations located exclusively in a code area of said operating program in said internal program memory.

3. A method as claimed in claim 1 comprising the additional steps of:

actuating a default key and checking an access authorization on the basis of an access code for entering into said mode that allows a modification of the data and thereafter loading said program to be interpreted from said plugged read-only memory module into said postage meter machine;

allocating a first MAC to a first portion of the contents of said read-only memory module to be interpreted and forming a first MAC checksum in said microprocessor covering said first content;

comparing said first MAC checksum to said first MAC;

if said first MAC checksum and said first MAC agree, executing a processing routine for processing said first content in said microprocessor after interpretation of the loaded program;

if said first MAC and said first MAC checksum do not agree, exiting said test routine and automatically executing security protection measures;

executing internal dealer routines for modifying said data in said postage meter machine;

loading a further program to be interpreted from an external plugged-in read-only memory module into said postage meter machine;

allocating a second MAC to a second content of the contents of said read-only memory module and forming a second MAC checksum over said second content;

comparing said second MAC checksum and said second MAC;

if said second MAC checksum and said second MAC agree, executing a processing routine for processing said second content in said microprocessor after interpretation of the program to be interpreted; and ending processing of said second content or preventing execution of said check routine if an error is found.

4. A method as claimed in claim 3 comprising the additional steps of:

providing an externally accessible EPROM base on said postage meter machine;

plugging an EPROM into said EPROM base, said EPROM having a key for access authorization;

connecting driver circuits in said postage meter machine to said EPROM base for preventing internal data from said postage meter machine from being read out to an exterior of said postage meter machine via said EPROM base; and upon actuation of said default key, modifying said data in said postage meter machine by executing a data modification program stored in said postage meter machine.

5. A method as claimed in claim 3 comprising the step of protecting said default key with a sealed postal flap, and opening said sealed postal flap for actuating said default key for entering into said mode that allows modification of the data.

6. A method as claimed in claim 3 comprising the additional steps of:

providing an externally accessible EPROM base on said postage meter machine;

plugging an EPROM into said EPROM base, said EPROM having a key for access authorization;

connecting driver circuits in said postage meter machine to said EPROM base for preventing internal data from said postage meter machine from being read out to an exterior of said postage meter machine via said EPROM base; and modifying said data in said postage meter machine using an interpreter routine applied from an exterior of said postage meter machine via said EPROM base.

7. A method for modifying data loaded into data cells of an electronic postage meter machine, comprising the steps of:

a) entering into a mode that allows a modification of the data loaded in the memory cells of the electronic postage meter machine, plugging a storage medium containing a program to be interpreted into said postage meter machine and loading said program to be interpreted from the plugged storage medium into the postage meter machine;

b) calling a check routine which is executed by an OTP processor in a secure, internal region of said OTP processor, for conducting at least one of a check of the validity of a program code and a check of data of said loaded program on the basis of an MAC stored in said storage medium, said OTP processor conducting said check routine with a selected checksum method; and modifying said data in said postage meter machine given validity of the loaded program to be interpreted and agreement of the data checked with the MAC, and exiting the check routine of the postage meter machine if either the loaded program is determined to be invalid or in the absence of MAC agreement and automatically executing security protection measures.

8. A method as claimed in claim 7 comprising the additional steps of:

providing an externally accessible EPROM base on said postage meter machine;

plugging an EPROM into said EPROM base, said EPROM having a key for access authorization;

connecting driver circuits in said postage meter machine to said EPROM base for preventing internal data from said postage meter machine from being read out to an exterior of said postage meter machine via said EPROM base; and modifying said data in said postage meter machine using an interpreter routine applied from an exterior of said postage meter machine via said EPROM base.

9. A method as claimed in claim 7 comprising the additional steps of:

providing a plurality of areas in said storage medium containing code to be interpreted and respectively securing each of said areas with respective MACs;

providing a mode for processing service functions;

executing an interpreter routine within said mode for service functions by calling said service functions via a keyboard including actuating a key of said keyboard which identifies memory contents in an area of said storage medium to be loaded, authenticating the data to be loaded using its MAC and, given MAC agreement, interpreting the data in said area and, if no code to be interpreted is allocated to a key of said keyboard, continuing normal processing using said key.

10. A method as claimed in claim 9 comprising the additional steps of:

transmitting an externally stored, predetermined MAC value into an OTP-RAM in said OTP processor for volatily storing said predetermined MAC therein, allocating a first MAC to first contents of a memory and forming a first MAC checksum covering said first contents;

entering into said mode for processing servicing functions and implementing routines for service functions using said interpreter routines and ending said mode for processing servicing functions; and transmitting an externally stored, predetermined MAC into said OTP-RAM for volatile storage therein, allocating a second MAC to second contents of said memory and forming a second MAC checksum in said OTP processor covering said second contents.

11. A method as claimed in claim 7 comprising the additional steps of:

storing an interpreter routine in an internal program memory of said postage meter machine;

providing an externally accessible EPROM base on an exterior of said postage meter machine and activating said interpreter routine by applying activating data from the exterior of said postage meter machine via said external EPROM base for causing said interpreter routine to operate, in combination with an operating program for said postage meter machine;

activating an access key to enter into said mode that allows modification of the data; and including data in said activating data which are processed by said interpreter routine and said microprocessor executing operations located exclusively in a code area of said operating program in said internal program memory.

12. A method as claimed in claim 11 comprising the additional steps of processing data in said interpreter routine formed by a series of commands each composed of a data set with three components;

in a first of said three components, identifying an operation to be executed by that command;

in a second of said three components, identifying a type of value; and in a third of said components, identifying said value.

13. A method as claimed in claim 7 comprising the additional steps of:

triggering said check routine by actuating a default key; and upon actuation of said default key, executing one of copying said first contents into an internal data area of said OTP-RAM, forming an MAC checksum, encoding a checksum covering said first contents and executing an MAC comparison for said MAC checksum covering said first contents, encoding a checksum covering said second contents and executing an MAC comparison to said MAC checksum covering said second contents; and identifying errors occurring in processing during said interpretation which result in a termination of said interpretation.

14. A method as claimed in claim 13 comprising the additional steps of:

storing an interpreter routine in an internal OTP-ROM program memory of said electronic machine;

providing an externally accessible EPROM base on an exterior of said postage meter machine and activating said interpreter routine by applying activating data from the exterior of said electronic machine via said external EPROM base for causing said interpreter routine to operate, in combination with an operating program in said OTP-ROM for said electronic machine;

activating an access key to enter into said mode that allows modification of the data; and including data in said activating data which are processed by said interpreter routine and said microprocessor executing operations located exclusively in a code area of said operating program in said OTP-ROM.

15. A method as claimed in claim 7 comprising the additional steps of:

actuating a default key and checking an access authorization on the basis of an access code for entering into said mode that allows a modification of the data and thereafter loading said program to be interpreted from said plugged read-only storage medium into said postage meter machine;

transmitting an externally stored, predetermined MAC value into an OTP-RAM in said OTP processor for volatily storing said predetermined MAC therein, allocating a first MAC to first contents of a memory and forming a first MAC checksum covering said first contents;

comparing said first MAC checksum to said first MAC;

if said first MAC checksum and said first MAC agree, executing a processing routine for processing said first content in said microprocessor after interpretation of the loaded program;

if said first MAC and said first MAC checksum do not agree, exiting said test routine and automatically executing security protection measures;

executing internal dealer routines for modifying said data in said postage meter machine;

transmitting an externally stored, predetermined MAC value into an OTP-RAM in said OTP processor for volatily storing said predetermined MAC therein, allocating a second MAC to second contents of a memory and forming a second MAC checksum covering said second contents;

comparing said second MAC checksum and said second MAC;

if said second MAC checksum and said second MAC agree, executing a processing routine for processing said second content in said microprocessor after interpretation of the program to be interpreted; and ending processing of said second content or preventing execution of said check routine if an error is found.

16. A method as claimed in claim 15 comprising the additional steps of:

providing an externally accessible EPROM base on said postage meter machine;

plugging an EPROM into said EPROM base, said EPROM having a key for access authorization;

connecting driver circuits in said postage meter machine to said EPROM base for preventing internal data from said postage meter machine from being read out to an exterior of said postage meter machine via said EPROM base; and upon actuation of said default key, modifying said data in said postage meter machine by executing a data modification program stored in said postage meter machine.

17. A method as claimed in claim 15 comprising the step of protecting said default key with a sealed postal flap, and opening said sealed postal flap for actuating said default key for entering into said mode that allows modification of the data.

18. A method for modifying data loaded into memory cells of an electronic machine, said electronic machine having a microprocessor for executing steps for a routine controlled by an external storage medium, said method comprising the steps of:

(a) entering into a mode that allows a modification of the data loaded in the memory cells of the electronic machine;

(b) calling a check routine, which executes in a secure, internal region of the electronic postage meter machine, for checking at least one of the validity of a program code the loaded program to be interpreted and data associated with said loaded program in a predetermined memory location, with a finding of validity being based on an authentification method; and (c) modifying said data in the electronic machine given validity of the loaded program to be interpreted that was checked with the authentification method, and exiting the check routine of the electronic machine if the loaded program to be interpreted is invalid and automatically executing security protection measures.

* * * * *